United States Patent
Narramore et al.

(10) Patent No.: US 7,912,681 B2
(45) Date of Patent: Mar. 22, 2011

(54) METHOD FOR DESIGNING A FLIGHT VEHICLE

(75) Inventors: Jim C. Narramore, Bedford, TX (US); Stacey Kelly, Argyle, TX (US); Robert Milliken, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 932 days.

(21) Appl. No.: 11/663,905

(22) PCT Filed: Oct. 17, 2005

(86) PCT No.: PCT/US2005/037033
§ 371 (c)(1),
(2), (4) Date: Mar. 26, 2007

(87) PCT Pub. No.: WO2006/032700
PCT Pub. Date: Mar. 30, 2006

(65) Prior Publication Data
US 2008/0140359 A1 Jun. 12, 2008

(51) Int. Cl.
G06F 17/50 (2006.01)
G06F 7/48 (2006.01)
G09B 9/08 (2006.01)
(52) U.S. Cl. .................. 703/1; 703/8; 434/30
(58) Field of Classification Search .............. 703/1, 2, 703/8; 434/30, 33, 34, 37
See application file for complete search history.

(56) References Cited

U.S. PATENT DOCUMENTS

| 2003/0048269 A1* | 3/2003 | Powell et al. ............ 345/420 |
| 2006/0239824 A1* | 10/2006 | Robertson et al. ...... 416/231 B |
| 2008/0042013 A1* | 2/2008 | Shmilovich et al. ..... 244/199.4 |

FOREIGN PATENT DOCUMENTS

WO 2004067380 A1 8/2004

OTHER PUBLICATIONS

Satchithanandam Venkataraman, (Modeling, Analysis and Optimization of Cylindrical Stiffened Panels For Reusable Launch Vehicle Structures, 1999).*
Supplementary European Search Report for EP 05 85 8238 dated Nov. 21, 2007.

(Continued)

Primary Examiner — Paul L Rodriguez
Assistant Examiner — Andre Pierre Louis
(74) Attorney, Agent, or Firm — James E. Walton

(57) ABSTRACT

A method for designing a flight vehicle includes determining a preferred aerodynamic shape of a structure of the vehicle; modifying the preferred aerodynamic shape based upon constraints; and determining, using aerodynamic computational fluid dynamics, limit loading conditions for the modified aerodynamic shape. A computer-implemented system for designing a flight vehicle includes at least one computer operable to determine a preferred aerodynamic shape of a structure of the vehicle; modify the preferred aerodynamic shape based upon constraints; and determine, using aerodynamic computational fluid dynamics, limit loading conditions for the modified aerodynamic shape. Software for designing a flight vehicle, embodied in a computer-readable medium, is operable to, when executed, determine a preferred aerodynamic shape of a structure of the vehicle; modify the preferred aerodynamic shape based upon constraints; and determine, using aerodynamic computational fluid dynamics, limit loading conditions for the modified aerodynamic shape.

15 Claims, 2 Drawing Sheets

OTHER PUBLICATIONS

Sistla R et al: "A distributed, heterogeneous computing environment for multidisciplinary design and analysis of aerospace vehicles" Advances in Engineering Software Elsevier vol. 31, No. 8-9, Aug. 2000, pp. 707-716, XP002459434, the whole document; in particular section "4. An aircraft design problem".

Wagner S It al: "CFD—a key element of helicoopter activities at the IAG" Aerospace Science and Technology Editions Scientifiques et Medicales Elsevier France, vol. 8, No. 2, Mar. 2004, pp. 121-130, XP002459435, the whole document; in particular section "3.2.1 Coupling scheme".

Hardee Edwin et al: "CAD-based design parameterization for shape optimization of elastic solids" Advances in Engineering Software Elseview Oxford, GB, vol. 30, No. 3, Mar. 1999, pp. 185-199, XP002418120, the whole document; in particular section "6. Turbine blade example".

Office Action in related Canadian Application No. 2,583,468, from the Canadian Intellectual Property Office dated Jul. 19, 2010.

* cited by examiner

METHOD FOR DESIGNING A FLIGHT VEHICLE

TECHNICAL FIELD

The present invention relates to designing flight vehicles. In particular, the present invention relates to a method for designing a flight vehicle using aerodynamic computational fluid dynamics.

DESCRIPTION OF THE PRIOR ART

The airframe of a flight vehicle, such as a rotorcraft or a fixed-wing aircraft, is designed based upon, among other things, the expected loads applied to the aircraft during flight. In particular, the airframe must be able to withstand the aerodynamic pressures encountered during the flight envelope. Conventional flight vehicle design methodologies have limitations in aerodynamic scope, the time to determine limit loads in the flight vehicle, and varying techniques in flight maneuver simulations. Conventionally, each maneuver is simulated to determine the critical flight parameters, such as airspeed, limit load factor, or sideslip angle, required by the design criteria. The criteria are not sufficiently specific to result in unique flight conditions in satisfying the required flight parameter combinations. Thus, in addition to requiring many iterations in order to converge on the required parameters, the conventional simulation process is user dependent and not repeatable. The time involved does not allow design iterations to optimize the limit load condition.

Conventionally, fuselage air loads are developed from running air load distributions, corresponding to typical pitching and yawing conditions. These running load distributions are then scaled to match the integrated fuselage air loads corresponding to the design flight maneuver conditions. The process of applying fuselage air load distributions to the structural finite element model is a lengthy process, involving intensive manual manipulations for each aerodynamic loading condition.

While there are many methods for designing flight vehicles that are well known in the art, considerable room for improvement remains.

SUMMARY OF THE INVENTION

There is a need for an improved method for designing a flight vehicle.

Therefore, it is an object of the present invention to provide an improved method for designing a flight vehicle.

In one aspect, the present invention provides a method for designing a flight vehicle, including determining a preferred aerodynamic shape of a structure of the vehicle; modifying the preferred aerodynamic shape based upon constraints; and determining, using aerodynamic computational fluid dynamics, limit loading conditions for the modified aerodynamic shape.

In another aspect, the present invention provides a computer-implemented system for designing a flight vehicle, the system including at least one computer operable to determine a preferred aerodynamic shape of a structure of the vehicle; modify the preferred aerodynamic shape based upon constraints; and determine, using aerodynamic computational fluid dynamics, limit loading conditions for the modified aerodynamic shape.

In yet another aspect of the present invention, software for designing a flight vehicle is provided. The software is embodied in a computer-readable medium and when executed operable to determine a preferred aerodynamic shape of a structure of the vehicle; modify the preferred aerodynamic shape based upon constraints; and determine, using aerodynamic computational fluid dynamics, limit loading conditions for the modified aerodynamic shape.

In another aspect, the present invention provides a system for designing a flight vehicle, including means for determining a preferred aerodynamic shape of a structure of the vehicle; means for modifying the preferred aerodynamic shape based upon constraints; and means for determining, using aerodynamic computational fluid dynamics, limit loading conditions for the modified aerodynamic shape.

The present invention provides significant advantages, including: (1) more reliably predicting air loads on a flight vehicle structure; (2) providing the air load predictions at a lower cost and in a shorter amount of time; and (3) minimizes operator variability.

Additional objectives, features and advantages will be apparent in the written description which follows.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
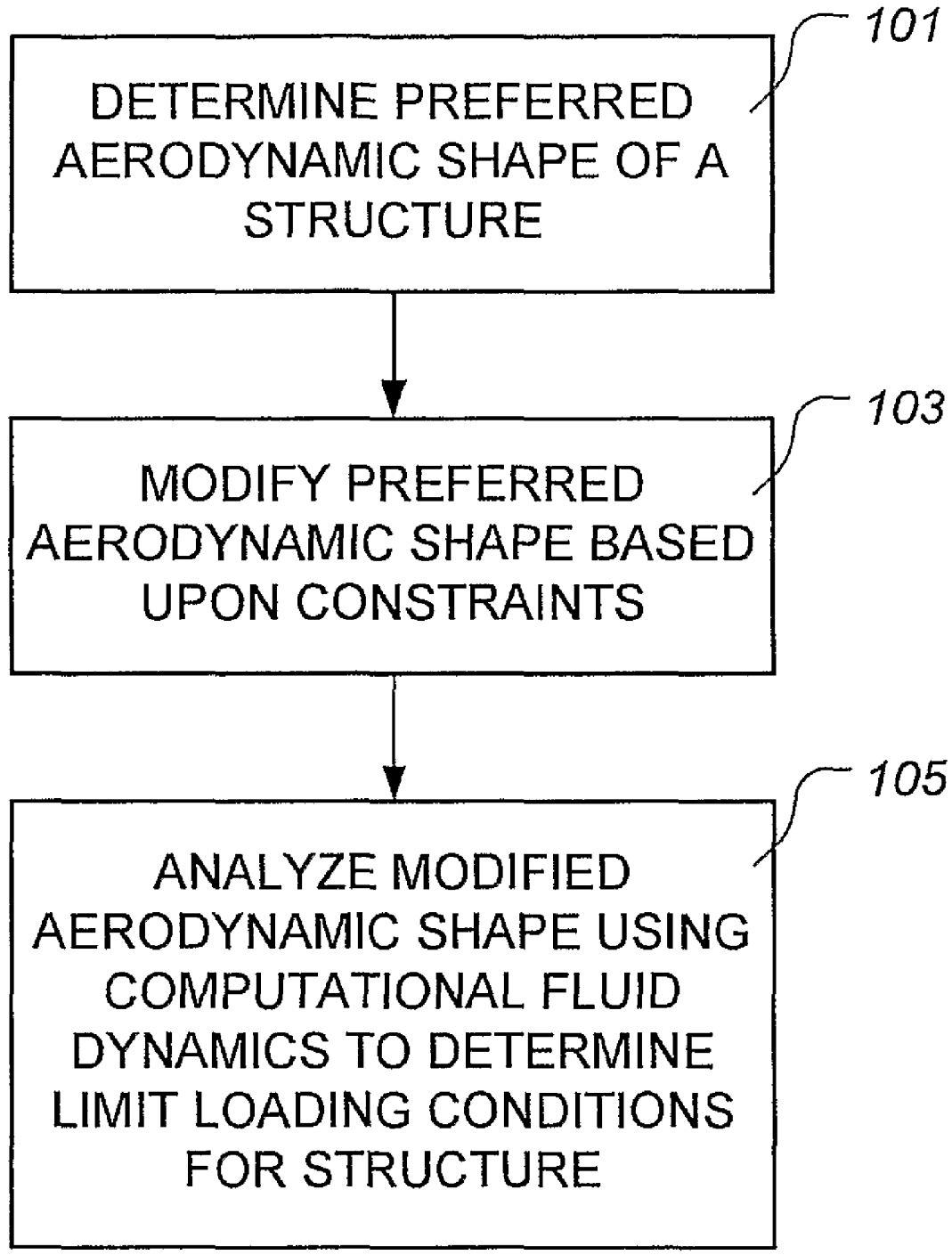
FIG. 1 is a flowchart representing an illustrative embodiment of a method of designing a flight vehicle according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention represents a method for designing a flight vehicle using "aerodynamic" computational fluid dynamics (CFD) and aircraft flight dynamics. Generally, CFD is the use of computers to analyze problems in fluid dynamics, wherein a continuous fluid is treated in a discretized fashion. In CFD, the spatial domain is discretized into small cells to form a volume mesh or grid, and then a suitable algorithm is applied to solve the equations of motion. Examples of such algorithms are Euler equations for inviscid flow and Navier-Stokes equations for viscid flow. In addition, such a mesh can be either irregular in form, for example, including triangles in 2D, or pyramidal solids in 3D, or regular in form. According to the present invention aerodynamic CFD applies CFD analysis techniques to the flow of air about a flight vehicle. Aircraft flight dynamics, as it pertains to the present invention, is the study of the orientation of air vehicles and how to control the critical flight parameters, typically named pitch, roll and yaw. The present invention uses aerodynamic CFD to determine aerodynamic loading on the flight vehicle (or a portion thereof) based upon the aerodynamic configuration of the vehicle. Through practice of the present invention, aerodynamic loading of the structure can be determined quickly, as compared to conventional techniques, thus reducing overall design time and cost.

FIG. 1 depicts a flowchart providing an illustrative embodiment of a method for designing a flight vehicle according to the present invention. While the description that follows pertains particularly to the design of a rotorcraft, the scope of the present invention is not so limited. Rather, the present method may be used in the design of any aircraft. According to the present invention, a preferred aerodynamic shape of a structure is determined (block 101). Preferably, the structure of block 101 is an entire airframe; however, the scope of the present invention is not so limited. Rather, the structure of block 101 may be only a portion of the airframe. Generally, the preferred shape of the structure is determined based upon many factors, including geometric factors and performance factors. Depending upon the particular implementations, such geometric factors include structure thickness, overall size of the structure, leading edge radius, trailing edge radius, manufacturing considerations, and the like. Performance factors that may be considered include vehicle speed, lift capability, thrust capability, and the like. In the step represented by block 101, a preferred aerodynamic shape is determined, based upon factors, such as the factors listed above.

The illustrated method further includes modifying the preferred aerodynamic shape, determined in block 101, based upon certain constraints (block 103). Specifically, while the shape determined in block 101 is preferred based upon aerodynamic considerations, other constraints may prevent the implementation of the preferred aerodynamic shape. For example, devices, equipment, structural components, or the like that are to be housed within the aerodynamic shape may be too large to fit within the preferred aerodynamic shape. Furthermore, it may be necessary for certain operational elements to extend from the vehicle. It should be noted that many other such constraints may exist for a particular flight vehicle. Accordingly, the preferred aerodynamic shape, determined in block 101, is modified based upon these constraints to produce a modified aerodynamic shape.

Still referring to FIG. 1, the method further includes analyzing the modified aerodynamic shape, modified in block 103, using aerodynamic CFD to determine limit loading conditions for the structure. Specifically, in block 105, aerodynamic CFD is used to determine the loads on the structure resulting from the flow of air about the structure throughout a portion of or an entirety of the intended flight envelope of the vehicle.

Figure 2:
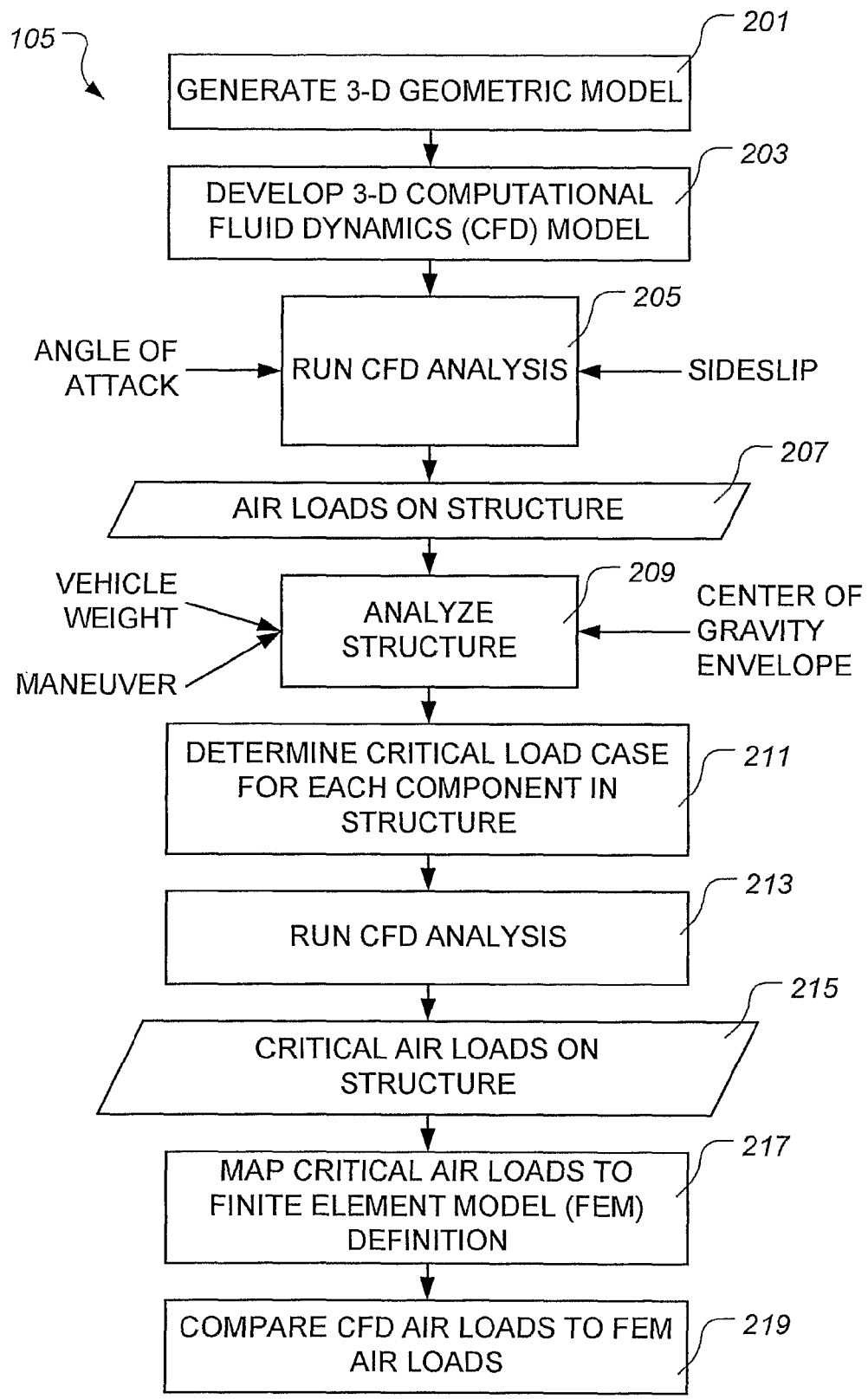
FIG. 2 is a flowchart representing an illustrative embodiment of a step of the method of FIG. 1.

FIG. 2 depicts a flowchart providing one particular embodiment of step 105 of FIG. 1. In the illustrated embodiment, a 3-D, geometric model describing the outside mold line (OML) of the structure is prepared (block 201). Generally, the 3-D, geometric model is prepared using a 3-D, computer-aided design software application, such as CATIA™, or the like. The method further includes the step of developing a 3-D, aerodynamic CFD model (block 203) using the 3-D, geometric model and grid generation techniques. Specifically, the 3-D, geometric model is transferred to a grid generation technique that produces calculation node points for an aerodynamic CFD analysis.

The present method further includes the step of running the aerodynamic CFD analysis (block 205) using various flight parameters at full-scale flight conditions (i.e., full vehicle speed and full vehicle size). In the illustrated embodiment, the aerodynamic CFD analysis is performed for various angles of attack and various degrees of sideslip. The scope of the present invention, however, is not so limited, as the particular flight parameters used in the aerodynamic CFD analysis are implementation specific, depending upon the type of aircraft being analyzed. For example, the flight parameters used in the step of block 205 are appropriate for analysis of a rotorcraft. Aerodynamic CFD analysis according to the present method for other types of aircraft, however, may employ different flight parameters. According to the present invention, the range of angles of attack and the range of sideslip are chosen to encompass the portion of the flight envelope where dynamic pressure causes high air loads. The aerodynamic CFD analysis provides the air loads on the structure (block 207), including forces, moments, and pressure distributions.

Still referring to FIG. 2, the structure is analyzed based upon the air loads on the structure (block 209). The loads on the entire structure (e.g., the entire flight vehicle) or on a component of the structure are analyzed for a set of aircraft limit maneuvers. For example, in the illustrated embodiment, the structure is analyzed in a symmetrical pull-up maneuver, a rolling pull-out maneuver, a yaw return, a jump take-off, and a symmetrical push-over, which are maneuvers of the rotorcraft art. The present invention, however, is not limited to analysis of the structure using these particular maneuvers. The particular maneuvers used in the present invention are implementation specific, depending at least in part on the type of aircraft being analyzed.

The following describes one particular set of maneuvers used in the present invention. As noted above, however, the scope of the present invention is not limited to these particular maneuvers and, in some embodiments, may omit certain of these maneuvers. In one particular embodiment, the structure is analyzed in a symmetrical pull-up maneuver at about 1.1 $V_{NE}$ (velocity never exceed) to the limit load factor or maximum rotor thrust. Both power on and power off maneuvers are considered.

Moreover, the structure is analyzed in a rolling pull-out maneuver, which is generally the symmetrical pull-up maneuver with lateral rotor flapping and maximum tail rotor thrust. The structure is analyzed in a yaw return maneuver at about five-knot increments from about maximum horizontal velocity (Vh) to about 0.6 Vh, with a predefined sideslip envelope. If the aircraft is unable to attain the sideslip envelope, then the maximum possible sideslip with dynamic over swing may be used. The structure is analyzed in a jump take-off maneuver at maximum take-off power with limit flapping in any direction. The structure is also analyzed in a symmetrical pushover at 1.1 $V_{NE}$ to the minimum limit load factor. Both power on and power off maneuvers are considered.

Still referring to bock 209 of FIG. 2, the structure is analyzed using some or all of the maneuvers described above for gross weight and center of gravity (CG) envelope. The gross weight/CG envelope analysis includes heavy/forward CG, heavy/aft CG, light/forward CG, light/aft CG, and any point that defines a corner of the envelope.

Based upon the structure analysis of block 209 described above, the critical load case is determined for each component in the structure (block 211). The limit cases are determined by the peak loads in each of the three force and moment axes located at the aerodynamic center of each component. In rotorcraft design, the tailboom joint is a specialized case, in that all of the loads aft of the tailboom joint are included in the calculation, including the inertial loads from the weight of the tail. The tailboom cross-section is divided into quadrants and the peak load in each quadrant is determined.

A second aerodynamic CFD analysis is performed (block 213) using the critical case conditions determined in block 211. For CFD analysis, the critical case conditions are defined in terms of airspeed, angle of attack, and sideslip. In the initial aerodynamic CFD analysis (block 205), air loads on the structure are determined for a wide range of conditions. In this second aerodynamic CFD analysis (block 211), loads on the structure are determined for specific, critical case conditions. The aerodynamic CFD analysis of block 211 provides critical air loads on the structure (block 215).

Still referring to FIG. 2, the critical air loads (block 215) provided by the aerodynamic CFD analysis of block 213 are mapped to a finite element model (FEM) definition, such as a NASTRAN model, of the structure or component of the structure. In one embodiment of the present invention, a PLOAD4 deck for the NASTRAN model is generated automatically from the critical air loads on the structure. To ensure the process is producing accurate results, the air loads on the FEM are compared to the air loads computed from the aerodynamic CFD model.

The scope of the present invention encompasses a computer-implemented system for designing a flight vehicle, the system comprising at least one computer operable to perform at least one of the embodiments of the method of the present invention disclosed above. Moreover, the scope of the present invention encompasses software for designing a flight vehicle, the software embodied in a computer-readable medium and when executed operable to perform at least one of the embodiments of the method of the present invention disclosed above. By way of example and illustration, a computer is but one means for carrying out at least one embodiment of the present invention as set forth above.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A method for designing a flight vehicle, comprising:
    determining a preferred aerodynamic shape of a structure of the vehicle;
    modifying the preferred aerodynamic shape based upon constraints; and
    determining, using aerodynamic computational fluid dynamics, limit loading conditions for the modified aerodynamic shape, comprising:
        preparing a 3-D, geometrical model of an outside mold line of the structure;
        developing a 3-D, aerodynamic computational fluid dynamics model from the 3-D, geometrical model;
        running a first aerodynamic computational fluid dynamics analysis using the 3-D, computational fluid dynamic model to predict air loads on the structure;
        analyzing the structure based upon the air loads on the structure predicted by the first aerodynamic computational fluid dynamics analysis;
        determining a critical load case for each component in the structure based on the predicted air loads from the first aerodynamic computational fluid dynamics analysis;
        running a second aerodynamic computational fluid dynamics analysis using the 3-D, computational fluid dynamic model for each critical load case to determine critical air loads on the structure; and
        mapping the determined critical air loads on the structure to a finite element model;
        wherein the critical load case for each component in the structure is defined in terms of at least one of airspeed, angle of attack, and sideslip wherein the structure is further analyzed in a yaw rate maneuver at speed increments from maximum horizontal velocity with a predefined sideslip envelope, further wherein if the aircraft is unable to attain the sideslip envelope, a maximum possible sideslip envelope is used.

2. The method, according to claim 1, wherein the flight vehicle is a rotorcraft.

3. The method, according to claim 1, wherein the determining, using aerodynamic computational fluid dynamics, the limit loading conditions further comprises:
    comparing the determined critical air loads to air loads of the finite element model.

4. The method, according to claim 3, wherein the finite element model is a NASTRAN model.

5. The method, according to claim 4, further comprising:
    generating a PLOAD4 deck for the NASTRAN model from the results of the second aerodynamic computational fluid dynamics analysis.

6. The method, according to claim 1, wherein the running the first computational fluid dynamic analysis considers at least one of an angle of attack of the flight vehicle and a side slip of the vehicle.

7. The method, according to claim 1, wherein the 3-D, geometrical model is used to generate calculation node points for the 3-D, aerodynamic computational fluid dynamics model.

8. The method, according to claim 1, wherein the running the first aerodynamic computational fluid dynamics analysis considers full scale flight conditions.

9. The method, according to claim 1, wherein the analyzing the structure considers at least one of a weight of the flight vehicle, a center of gravity envelope of the flight vehicle, and a vehicle maneuver.

10. The method, according to claim 9, wherein the vehicle maneuver comprises:
    at least one of a symmetrical pull-up, a rolling pull-out, a yaw return, a jump take-off, and a symmetrical pushover.

11. The method, according to claim 9, wherein the analyzing the structure considers at least one of a heavy weight and a light weight.

12. The method, according to claim 9, wherein the analyzing the structure considers at least one of a forward center of gravity and an aft center of gravity.

13. The method, according to claim 1, wherein the critical load case for each component is determined by peak loads in each of three force axes and in each of three moment axes, located at an aerodynamic center of the component.

14. A computer-implemented system for designing a flight vehicle, the system comprising at least one computer operable to:
   determine a preferred aerodynamic shape of a structure of the vehicle;
   modify the preferred aerodynamic shape based upon constraints; and
   determine, using aerodynamic computational fluid dynamics, limit loading conditions for the modified aerodynamic shape;
   wherein the at least one computer is operable to determine, using aerodynamic computational fluid dynamics, limit loading conditions by:
      preparing a 3-D, geometrical model of an outside mold line of the structure;
      developing a 3-D, aerodynamic computational fluid dynamics model from the 3-D, geometrical model;
      running a first aerodynamic computational fluid dynamics analysis using the 3-D, computational fluid dynamic model to predict air loads on the structure;
      analyzing the structure based upon the air loads on the structure predicted by the first aerodynamic computational fluid dynamics analysis;
      determining a critical load case for each component in the structure based on the predicted air loads from the first aerodynamic computational fluid dynamics analysis;
      running a second aerodynamic computational fluid dynamics analysis using the 3-D, computational fluid dynamic model for each critical load case to determine critical air loads on the structure; and
      mapping the determined critical air loads on the structure to a finite element model;
      wherein the critical load case for each component in the structure is defined in terms of at least one of airspeed, angle of attack, and sideslip wherein the structure is further analyzed in a yaw rate maneuver at speed increments from maximum horizontal velocity with a predefined sideslip envelope, further wherein if the aircraft is unable to attain the sideslip envelope, a maximum possible sideslip envelope is used.

15. The system, according to claim 14, wherein the at least one computer is operable to determine, using aerodynamic computational fluid dynamics, limit loading conditions by:
   comparing the determined critical air loads to air loads of the finite element model.

* * * * *